Feb. 4, 1930.  H. C. DORTON  1,745,609
HUMANE ANIMAL TRAP
Filed March 12, 1928
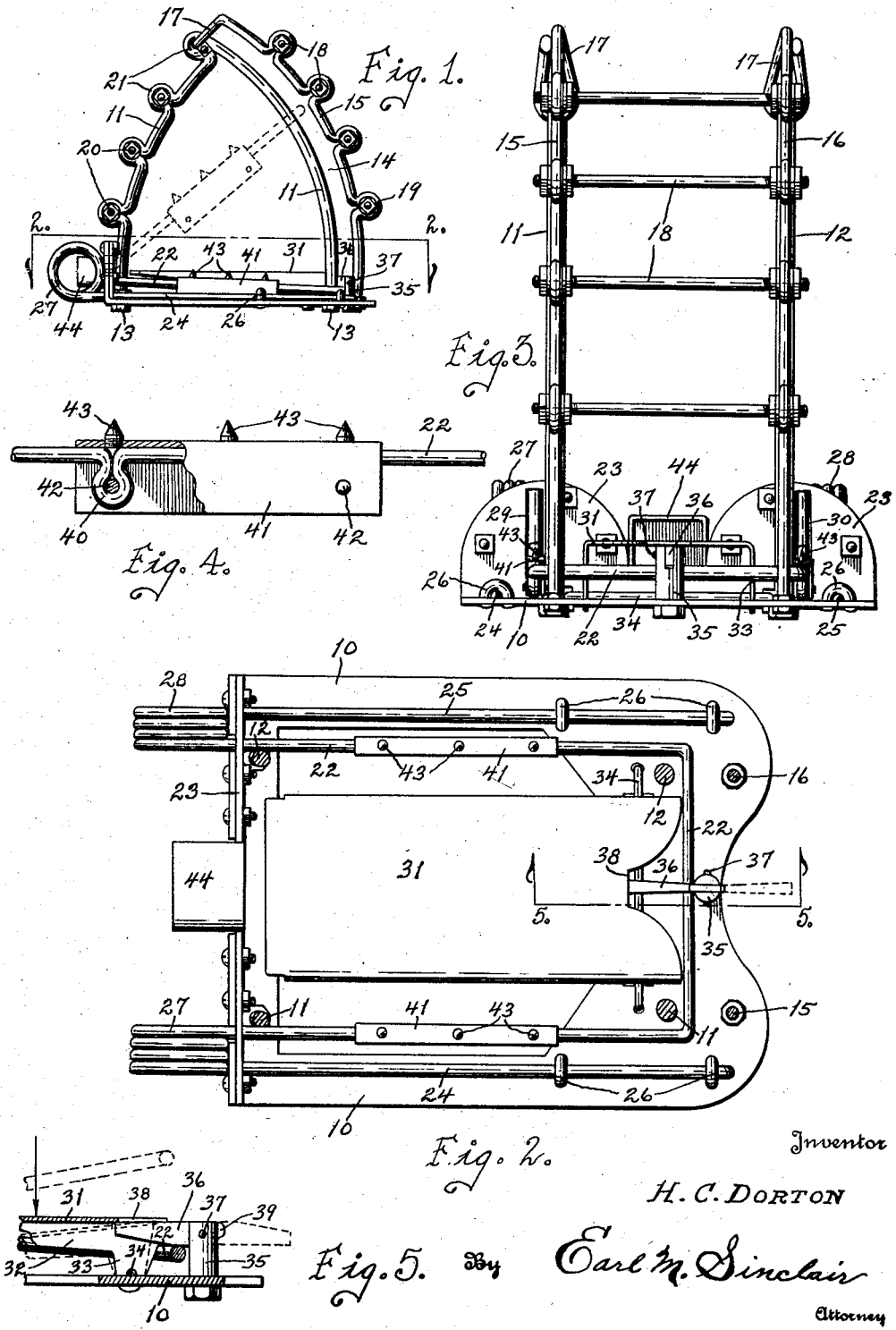

Patented Feb. 4, 1930

1,745,609

UNITED STATES PATENT OFFICE

HENRY C. DORTON, OF FONDA, IOWA

HUMANE ANIMAL TRAP

Application filed March 12, 1928. Serial No. 261,034.

The object of this invention is to provide an improved construction for an animal trap which is so arranged that it must be sprung by any animal entering it and which operates to kill the animal instantly or at least very quickly, usually by breaking his back.

A further object of the invention is to provide an improved animal trap which may be set in a runway either on land or under water, which may be effectively concealed by covering it with leaves or dirt, and which may be entered by an animal traveling in either direction in the runway.

With these and other objects in view, my invention consists in the construction, arrangement and combination of elements hereinafter set forth, pointed out in the claims and indicated by the accompanying drawing in which—

Fig. 1 is an end elevation of my improved trap, the solid lines showing the trap in set position and the dotted lines indicating the position of the spring actuated jaw as it travels toward closed position.

Fig. 2 is a horizontal section on the line 2—2 of Fig. 1 on an enlarged scale.

Fig. 3 is a view at right angles to Fig. 1, on the same scale as Fig. 2.

Fig. 4 is a detail elevation, partly in section, showing a portion of the spring actuated jaw and the method of mounting teeth thereon.

Fig. 5 is a detail section on the line 5—5 of Fig. 2, illustrating the method of holding the trap in set position.

I have employed the numeral 10 to designate a base plate which is arranged in horizontal position and is here shown as having a relatively large central opening to permit the movable jaw and members carried thereby to move to the desired position for setting the trap. An arched frame is fixed to and rises from the base plate 10 and is here shown as composed of two heavy wires or steel rods 11 and 12 having their ends extended through the base plate 10 and secured by nuts 13 or the like. At one side of the arched frame, an arcuate guide 14 is formed by placing a pair of guide wires or rods 15 and 16 substantially parallel with the adjacent portions of the frame members 11 and 12, said guide members being secured at their lower ends to the base plate 10 and at their upper ends extended laterally and connected by eyes 17 to the apex of the arched frame. The guide members 15 and 16 are connected transversely by cross rods 18 which may be carried by eyes or loops 19 formed in said members. In a similar manner, the opposite side of the arched frame is provided with cross rods 20, which may be carried by eyes 21 formed in the frame members 11 and 12 at suitable intervals.

One side of the frame formed as above described, constitutes a fixed jaw of the trap and cooperating therewith is a movable jaw 22 formed of a piece of spring rod or heavy wire bent in the form of a yoke having its cross member arranged for travel in the guideways 14, that is to say, between the guide members 15 and 16 and the adjacent portions of the arched frame members 11 and 12. At the side opposite to the guideways 14, the base plate 10 is formed with an upturned flange 23. The leg portions of the yoke-shaped jaw 22 are designated by the numerals 24 and 25 and said members are arranged on opposite sides of the base plate 10 and rigidly secured thereto by any suitable means such as riveted staples 26. The intermediate portions of the jaw member, between the fixed leg portions 24 and 25 and the movable yoke 22, are coiled to form springs 27 and 28, which are located on the outer face of the flange 23, through which the leg portions 24 and 25 extend. The flange 23 is formed near its ends with vertical slots 29 and 30, through which the side members of the yoke-shaped jaw 22 extend and are movable.

A trigger plate 31 is provided and preferably is sufficiently large to cover nearly the whole area inclosed by the arched frame. The trigger plate 31 is formed with downturned flanges 32 on its side margins and these flanges terminate at one end in further downwardly extending ears 33 which are pivotally connected at 34 to the base plate 10 at a point near the lower end of the arcuate guideways 14. A post 35 is fixed to and rises from the base plate 10 centrally of one margin thereof and adjacent the pivotal axis 34 of the trigger plate. The post 35 is just outside the lower end of the guideways 14 and the cross bar of the yoke-shaped jaw member 22 may pass between said post and the pivot of the trigger plate for the purpose of setting the trap. A latch 36 is pivoted on a pin 37 carried by the upper end of the post 35 and is adapted to extend across the lower end of the guideways and to engage beneath the trigger plate 31 at a point on the opposite side of the pivot 34; the adjacent end portion of said trigger plate being formed with a central notch 38 to permit such engagement and also to permit the travel of the latch to the position indicated by dotted lines in Fig. 2 and Fig. 5 when the trap is sprung. The latch 36 has its major portion extending in one direction from the pivot 37; but said latch bar also extends a slight distance in the opposite direction to form a rounded nose 39.

To set the trap, the yoke-shaped jaw member 22 is depressed manually against the action of the springs 27 and 28, thereby causing the central cross member thereof to travel downwardly in the guideways 14 until it encounters the rounded nose 39 of the latch and passes by said nose, thereby causing the latch 36 to swing through an arc of substantially 180 degrees and occupy a position transversely of the cross member of the jaw, as indicated in Figs. 2 and 5. The trigger plate 31 is then lifted manually and the free end of the latch 36 is caused to engage underneath the notched portion thereof, the upward pressure of the spring actuated jaw member 22 serving to hold the latch and trigger plate in set position, as will be understood from the showing in Fig. 5.

The trap may be set in a runway or other place known to be frequented by animals to be trapped and may be effectively concealed by placing sticks, mud, leaves, and similar natural objects on the frame, such objects being supported by the frame members 11 and 12, by the guide members 15 and 16 and by the cross bars 18 and 20. An animal entering the trap from either direction will almost necessarily step on the plate 31 and move it downwardly. A slight downward movement of the plate 31, on its pivot 34, will cause the notched portion to pass beyond the end of the latch 36, and the action of the springs 27, 28 will cause the yoke-shaped jaw 22 to fly upwardly, its cross member traveling in the arcuate guideways 14, and its side members traveling toward that side of the frame opposite to the guideways. The animal which has thus sprung the trap will be caught between the spring actuated jaw member and the forward end of the arched frame, and the force of the springs 27 and 28 is intended to be sufficiently great to kill the animal almost instantly as by breaking its back or strangling it. As the trigger plate 31 as well as the arched frame, are of considerable width, it is practically impossible for an animal to enter the arched frame without springing the trap or to escape being caught when the trap is sprung.

To increase the effectiveness of the trap, I have added several pointed teeth on each side of the spring actuated jaw 22. These teeth may be mounted in the manner shown particularly in Fig. 4, by forming one or more downwardly extending eyes 40 on the jaw member 22 and by placing a channel-shaped rider 41 over each side member of the jaw and securing it by rivets 42 passing through the eyes 40. The closed side of the channel-shaped rider 41 rests on or near the top side of the side bar of the jaw and is formed with threaded apertures in which attenuated spikes or teeth 43 are mounted. It is to be understood that any desired number of the teeth 43 may be employed and that they may be mounted in various ways and at various locations on the jaw member.

I have also shown a bait box 44 located at one end of the base plate 10, preferably in a notch formed centrally of the flange 23. The bait box 44 preferably opens toward the trigger plate 31 and may be employed to receive suitable bait or any substance possessing an odor attractive to the animals desired to be trapped.

It is to be understood that the elements of my improved trap may be modified in various ways without departing from the spirit of my invention; and particularly that the construction of the arched frame may be varied materially, within the scope of the appended claims, without departing from my invention.

I claim as my invention:

1. An animal trap comprising a base plate formed with an upstanding flange at one end, an arched frame rising from said base plate, an arcuate guideway at one side of said frame, coil springs located at the outer side of said upstanding flange and having their ends rigidly secured to said base plate, a yoke-shaped jaw member integrally formed with said springs and extending movably through said upstanding flange, said yoke-shaped jaw member having its central portion arranged for travel in said guideway and said springs acting to carry said jaw member toward the opposite side of said frame, a trigger plate pivoted on said base plate, a latching means pivotally mounted to engage the central portion of said jaw member and also to engage said trigger plate and hold it in elevated position, and a bait holding means arranged near one end of said base plate.

2. An animal trap comprising a base plate, a pair of arched frame members rising from said base plate, spaced cross bars connecting said frame members, guide members arranged substantially parallel with one side of each frame member to form an arcuate guideway, cross bars carried by said guide members, a spring pressed jaw member of yoke form arranged for oscillation between said frame members and having its closed end arranged for travel in said guideway, a trigger plate pivotally mounted on said base plate, and a latching means pivotally mounted and adapted to engage the closed end of said jaw member to hold it in depressed position and also engaging said trigger plate to hold it in elevated position under tension of said jaw member.

3. An animal trap comprising a base member, an arched frame rising therefrom, coil springs located at one side of said base member and having their ends rigidly anchored, a yoke-shaped jaw member connected with said springs and adapted to be urged thereby toward one side of said arched frame, a trigger plate pivoted on said base member, means cooperating with said trigger plate for holding said jaw member in set position, and a bait box arranged near one end of said base member and having an opening directed toward said trigger plate.

4. In an animal trap, a jaw member including a rod, said rod being formed with spaced rearwardly extending eyes, a channel-shaped rider embracing a portion of said rod, securing means extending through said rider and through eyes of said rod, and forwardly extending teeth carried by said rider.

HENRY C. DORTON.